United States Patent

[11] 3,600,852

| [72] | Inventors | William R. Burke<br>Tonawanda;<br>Donald R. Kole, Cheektowaga, both of, N.Y. |
|---|---|---|
| [21] | Appl. No. | 827,988 |
| [22] | Filed | May 26, 1969 |
| [45] | Patented | Aug. 24, 1971 |
| [73] | Assignee | National Gypsum Company<br>Buffalo, N.Y. |

[54] HARDENABLE PLANT-SEED-CONTAINING COMPOSITIONS AND METHOD FOR ESTABLISHING PLANT GROWTH
20 Claims, No Drawings

| [52] | U.S. Cl. | 47/58, 47/9 |
|---|---|---|
| [51] | Int. Cl. | A01c 1/00 |
| [50] | Field of Search | 47/9, 56, 58, DIG. 9, DIG. 10; 71/1, 64 |

[56] References Cited
UNITED STATES PATENTS

| 79,765 | 7/1868 | Lafferty et al. | 47/DIG. 9 |
|---|---|---|---|
| 1,882,377 | 10/1932 | Whittelsey | 47/9 |
| 2,648,165 | 8/1953 | Nestor | 47/65 |
| 2,802,303 | 8/1957 | Weeks | 47/9 |
| 2,877,599 | 3/1959 | Heberstreet et al. | 47/9 |
| 3,077,054 | 2/1963 | Niemeijer | 47/9 |
| 3,320,696 | 5/1967 | Wright et al. | 47/9 |
| 3,387,405 | 6/1968 | Iwasyk et al. | 47/9 |

*Primary Examiner*—Robert E. Bagwill
*Attorney*—Robert F. Hause

ABSTRACT: A composition for distributing plant seeds over a soil surface and maintaining them in place until germination and plant growth occur is described comprising a major weight amount of a hardenable binder material and a minor weight amount of plant seeds.

A method for establishing plant growth in a soil surface and concurrently preventing erosion of the soil surface employing a composition as described above.

HARDENABLE PLANT-SEED-CONTAINING COMPOSITIONS AND METHOD FOR ESTABLISHING PLANT GROWTH

BACKGROUND OF THE INVENTION

Steeply sloped surface areas such as embankments along newly constructed highways and the like are readily susceptible to erosion caused by winds and/or rainfall. It is important, therefore, to establish growing vegetation of some type quickly in order to prevent extensive damage from being inflicted upon the land surface.

It is difficult, however, to plant seeds in these locations and to keep them in place until they have had an opportunity to germinate and establish the roots in the soil. Ordinary seed-planting techniques are very expensive to employ in these areas and are relatively ineffective for the seeds can be easily blown or washed away or lost through attack by birds or rodents before vegetation growth can become established.

Various methods have been suggested to overcome these disadvantages. Thus, it has been taught to rake the seeds into the surface soil with hand labor, then covering them with fibrous material, e.g. straw or the like, along with asphalt or latex emulsions to hold the fibers in place to achieve a fibrous mat which can protect the seeds and finally watering the fibrous mat to provide moisture for effecting germination of the seeds. Another known method is to distribute aqueous mixtures of seeds, fibrous material, fertilizer and a binder such as an asphalt or latex emulsion over the soil surface by means of a spray apparatus having a nozzle with a relatively large orifice. These methods have not been found to be completely satisfactory, however, for some of them are relatively expensive due to high labor costs whereas, others, although effective in reducing costs, are nevertheless susceptible to having the seeds dissipated before plant growth can be established.

SUMMARY OF THE INVENTION

It is an object of this invention to provide a highly efficient and economical method of establishing vegetation growth in a soil surface and, at the same time, preventing erosion of the soil. It is a further object to do so by providing a medium which will protect the soil surface, serve as an environment within which plant seeds can germinate and which also will allow the plant root growth to become established in the soil. It is yet another object to provide such a method which may be practiced with various types of surface soils.

Another object of the invention is to provide a method for distributing plant seeds quickly and evenly over a land surface substantially without any loss of seed. Further it is an object to provide a method in which the seeds are firmly held in place until they have had an opportunity to germinate and establish root growth in the soil.

Still further it is an object to provide potentially hardenable compositions which are adaptable for spreading over a land surface in the form of dry mixes or as aqueous slurries. Yet another object is to provide such compositions which, when contacted by water will eventually form a substantially continuous matrix which can perform as a germinating, rooting and growth medium for plant seeds. It is another object to form such substantially continuous matrices which will readily absorb and retain water. A further object is to provide such matrices having as their binders, materials which will slowly deteriorate as the plant seeds germinate and become established and thereafter be substantially dissipated.

It should be understood that the term "plant seeds" as used hereinafter means grass, vine, bush and tree seeds or seeds of any other growing vegetation. The term "plant-growth-promoting materials" includes fertilizers, hygroscopic materials and any other useful substances which preserve and promote minor weight growth.

The present invention resides in utilizing various materials which can form thin, porous layers of films as binders for plant seeds and as germination media therefor. The invention contemplates the formation of a spreadable composition by thoroughly mixing together a major weight amount of binder material with a minor weight amount of plant seeds and disposing a thin layer of the composition over a soil surface. The binder material is then formed into a substantially continuous, porous layer or film which substantially completely covers the soil surface.

According to the practice of the invention the layer or film formed by the binder material functions as a matrix to prevent the plant seeds from being scattered and also as protection against soil erosion. The matrix of binder material also serves as an environment which is conducive to seed germination and subsequent growth of the vegetation sought to be established in the soil. Plant-growth-promoting materials and filler materials may also be incorporated into the composition. The thin layers or films formed are relatively porous whereby they are able to absorb and retain the water necessary for plant seed germination and growth. The vegetation and root growths are capable of penetrating through the upper surface of the binder matrix and pushing down into the soil respectively. As these processes are occurring the binder matrix will slowly decay and break apart due to interaction with the elements. This deterioration will take place over a relatively lengthy period of time, it being dependent upon weather conditions, within which vegetation can become firmly established in the soil. Eventually the binder material will be substantially completely dissipated from the area leaving a soil-protecting growth of vegetation.

These and other objects of the invention will become readily apparent from the following detailed description of the preferred embodiments thereof when read in relation to the appended claims.

It is preferred to use gypsum stucco, $GaSO_4 \cdot 1/2H_2O$, as the binder material for the compositions formed in accordance with the invention. Gypsum stucco converts rapidly to calcium sulfate dihydrate, $CaSO_4 \cdot 2H_2O$, when introduced into an aqueous medium and then sets to form a hard, solid mass. Thus the method of the invention is preferably practiced by disposing a thin layer of a composition having gypsum stucco as its major weight component over a soil surface and then causing the stucco to hydrate and set thereby creating a substantially continuous, solid layer. This can be accomplished by forming an aqueous slurry of the composition prior to applying it to the soil surface or by bringing the layer of the composition into contact with water simultaneous with, or subsequent to, its application to the soil surface.

It should be recognized that gypsum stucco. $CaSO_4 \cdot 1/2H_2O$, has characteristics which have been found to be highly advantageous when used in accordance with the method of the invention. The particular characteristics of gypsum stucco have been found to be the preferred characteristics for the binder materials desired to be employed in the compositions of the invention.

The compositions formulated in accordance with the invention consist basically of a major weight amount of binder material and a minor weight amount of plant seeds. Minor weight amounts of plant-growth-promoting materials such as fertilizers, hygroscopic substances or the like and filler materials, preferably those which are high-bulking, water absorbing and retaining substances such as cellulosic fibers, inorganic particles or the like may be incorporated into the composition to facilitate the germination and growth processes. Where gypsum stucco is used as the binder material, additives such as a set retarder and/or a set accelerator for the stucco may be added. Foaming agents may also be used. The presence of these materials is mainly dependent upon the form in which the composition is applied to the soil surface; the source from which the gypsum is obtained; the prevailing weather conditions; and the type of distribution apparatus employed as will be more fully described further below.

The compositions of the invention may be distributed over soil surfaces in the form of dry mixes or as aqueous slurries. The application technique which is used in a particular situation is governed, for most purposes, by the size and shape of the area to be covered. Where relatively large areas are involved and/or the terrain is steeply sloped, it is preferred to apply the composition as an aqueous slurry. When gypsum stucco is used as the binder, it is preferred to apply the composition as an aqueous slurry containing from about 10 percent to about 60 percent solids. The slurry is preferably sprayed over the ground by means of an apparatus which has a relatively large nozzle orifice. In this manner, for example, it is possible to cover embankments along newly constructed highways from a spray apparatus which is located on a vehicle moving slowly on the side of the roadway. When these compositions are used by homeowners to plant grass on residential lawns or the like they are preferably applied in dry mix form from commercially available spreading equipment. Where resort is had to this latter application technique the water necessary for the gypsum stucco to hydrate and set may be supplied by watering the soil prior to distributing the composition or subsequent to doing so.

Where aqueous slurries of compositions having gypsum stucco as their binder are employed they should be formed just prior to distributing them over soil surfaces. These slurries generally have an average setting time of from about 25 to 35 minutes after they are formed. This setting time may be adjusted to anywhere from a few seconds to a number of hours with the proper additives. The slurry must, of course, be distributed over the soil surface before setting occurs. Thus, it may be necessary under some circumstances to lengthen the setting time of a slurry by adding a set-retarding substance to it. For example, where continuous cycle pumping equipment is used to feed the slurry from its storage tank to the spray equipment, it would be expedient to add the retarder to prevent the slurry from solidifying in the pump hoses. However, it should also be recognized that the layer of slurry which is laid down must be able to set before it dries out. A set-accelerating agent such as potassium sulfate is preferably added to the slurry prior to distributing it in order to ensure that these steps occur in the proper sequence. Atmospheric conditions may also dictate the necessity for an accelerating agent. It may be necessary where extremely hot temperatures are present; or it can be added where threatening weather conditions are encountered to ensure that the layer of slurry sets before it can be washed away by rainfall.

The present invention may be utilized to distribute plant seeds including tree, bush, vine and grass seeds or combinations thereof and to establish growth of these types of vegetation. Where plant seeds are distributed according to the method of the invention they subsequently need only to be accorded treatment similar to that required to induce vegetation growth, in the particular climate, from seeds which are disposed directly in the soil. In a preferred mode of practicing the invention it is utilized to establish grass growth in newly landscaped areas which are steeply sloped. Examples of the types of grasses which can be grown with this novel method includes bluegrasses, tall, creeping and chewings fescues, bentgrasses, perennial and annual ryegrasses and mixtures thereof. The amount of grass seed incorporated into a particular composition is determined by the type used; the surface area intended to be covered by a unit weight of the composition; the thickness of the layer of composition to be applied; and the thickness of growth desired. Excellent results have been obtained when the grass seed represented about 5 percent by weight of a composition having a gypsum stucco binder and a layer of about 1/16 inch was laid down. A 1/16 inch thick layer of such a composition can be formed by distributing about 10 pounds of composition over an area of about 60 square feet.

Different types of grass seeds as well as different types of plant seeds be incorporated into a formulation. For example, ryegrass seeds may be added together with other types of grass seeds. The ryegrass seeds germinate and establish growth in a relatively short period of time thus enabling the ryegrass to serve as a nurse crop for the other seeds which require a longer period of time to establish growth in the soil. Tree, bush and/or vine seeds can also be protected in this manner. Since they ordinarily require a considerably longer period to germinate and establish root growth, the protective layer or film would possibly have deteriorated prior to that time. The growth of ryegrass, however, would then be available to keep the tree, bush and/or vine seeds from being dissipated until they have had an opportunity to establish their root growth.

Adjustments may have to be made to the compositions in order to control the pH in relation to the type of seed present. Generally it is preferred to maintain the pH in the range of from about 6.4 to about 7.2 which will be suitable for many of the types of seeds to be planted.

The fertilizers which may be added to the compositions can be water soluble types as well as those which release their growth-promoting nutrients slowly over a relatively long period of time. Typically both of these types will be present together. The relative amount of each type present in any particular composition and the total fertilizer content will depend mainly upon the climatic conditions of the geographical area.

Filler materials can also be utilized in the formulations. It is preferred to use high-bulking materials which are capable of absorbing and retaining water. They may be organic materials such as discrete cellulosic fibers, shredded waste newsprint and the like or inorganic materials such as vermiculite, perlite, expanded glass beads and the like. The fillers serve to lower the density of the composition thus causing the soil-covering layer or film to be more porous whereby it can absorb water more readily and the grass shoots and root growth may penetrate through it more easily. The organic materials also serve as a mulch for the seeds. It is preferred to use fibers having relatively long lengths of about one-fourth inch or more and particles having diameters of up to about 0.07 inch. The porosity of the seed-containing matrix may also be increased, when the composition is distributed in an aqueous medium, by adding a small amount of a foaming agent to the composition.

Experiments have shown that this novel method of establishing plant growth in the soil is capable of providing outstanding results. Various compositions having gypsum stucco as their binder material were applied, in layers of about 1/16 inch thickness, to surface areas having slopes of from about 1:1 to about 1.5:1, these areas being free of growing vegetation. After considerable periods of time, for example about 1 month or longer, the protected areas exhibited a thick growth of grass and substantially no loss of soil whereas adjacent control areas where grass seeds were planted directly in the soil without any covering material suffered substantial damage due to erosion. Grass growth in the control areas was very spotty thus indicating that much of the grass seed has been dissipated before root growth could be established. It has also been shown that grass can be grown, with this technique, in soil which normally would not be able to provide a proper environment therefor without extensive prior preparation Thus, grass has been established and grown in clay through the use of this method. Plant growth could also be established, for example, in silt, sand, topsoil or combinations thereof.

There are many advantages inherent in the compositions and method of the invention. Substantial savings may be realized with respect to both labor costs as well as material costs for the compositions may be distributed quickly in a single application step and substantially none of the composition will be lost during the distribution thereof. The protection afforded the soil surface by the protective layer or film while vegetation growth is being established enables the surface to be maintained in substantially its original condition and consequently eliminates the necessity of reworking the surface as might otherwise be required if the soil were not protected during this period. Since the seeds are firmly held within the binder matrix until vegetation growth is established, loss of seed from wind, rain and/or attack by birds and rodents can be substantially eliminated.

A further advantage of this method relates to the ability to check certain weed growth. The formation of the substantially continuous seed-containing matrix can prevent germination of certain species of weed seeds which are present in the soil and which require sunlight for germination. Thus, during the critical period prior to germination these weed seeds will not be able to compete with the plant seeds in the matrix for moisture. Crabgrass seed is an example of a type of seed which requires sunlight for germination. When the seed-containing matrix deteriorates and breaks apart vegetation growth will be firmly established in the soil and weed killers may then be applied without harming it.

Having given a detailed description of the preferred embodiments of the invention so that those skilled in the art may practice the same we contemplate that variations may be made without departing from the essence of the invention or the scope of the claims.

What we claim is:

1. A method of establishing plant growth in a soil surface comprising the steps of thoroughly mixing together a major amount by weight of a hardenable binder material and a minor amount by weight of plant seeds to form a potentially hardenable composition, said binder material comprising gypsum stucco, combining said potentially hardenable composition with a quantity of water and thoroughly mixing them to make a settable aqueous slurry therefrom, the ratio of solids to water permitting the setting of said slurry, substantially covering a soil surface with a layer of said thoroughly mixed slurry, whereby said gypsum stucco forms a substantially continuous, thin, set gypsum layer containing said plant seeds, said set gypsum layer being of a thickness which allows said plant seeds to be accessible to moisture while substantially preventing their relative movement thereby leaving said plant seeds free to germinate and the soil surface is protected against erosion.

2. A method of establishing plant growth in a soil surface comprising the steps of thoroughly mixing together a major amount of weight by a hardenable binder material and a minor amount by weight of plant seeds to form a potentially hardenable composition, said binder material comprising gypsum stucco, substantially covering a soil surface with a layer of said potentially hardenable composition, applying a quantity of water to said layer, the ratio of solids to water permitting the hardening of said composition said ratio of solids to water being about 10:90 to about 60:40, said gypsum stucco forms a substantially continuous, thin, set gypsum layer containing said plant seeds, said set gypsum layer being of a thickness which allows said plant seeds to be accessible to moisture while substantially preventing their relative movement thereby leaving said plant seeds free to germinate and the soil surface is protected against erosion.

3. A method of establishing plant growth in a soil surface comprising the steps of thoroughly mixing together a major amount by weight of a hardenable binder material and minor amounts by weight of plant seeds, plant growth promoting materials and filler materials to form a potentially hardenable composition, said binder material comprising gypsum stucco, combining said potentially hardenable composition with a quantity of water and thoroughly mixing them to make a settable aqueous slurry therefrom of from about 10 percent to 60percent solids, the ratio of solids to water permitting the setting of said slurry, substantially covering a soil surface with a layer of said thoroughly mixed slurry, and hydrating said gypsum stucco binder whereby said gypsum stucco forms a substantially continuous, thin, set gypsum layer containing said plant seeds, said plant-growth-promoting materials and said filler materials, said set gypsum layer being of a thickness which allows said plant seeds, said plant-growth-promoting materials and said filler materials to be accessible to moisture while substantially preventing their relative movement thereby leaving said plant seeds free to germinate and the soil surface is protected against erosion.

4. The method as defined in claim 3 wherein the filler material is an organic material.

5. The method as defined in claim 3 wherein the filler material is selected from the group consisting of discrete cellulosic fibers, shredded waste newsprint and combinations thereof.

6. The method as defined in claim 3 wherein the filler material is an inorganic material.

7. The method as defined in claim 3 wherein the filler material is selected from the group consisting of vermiculite, perlite, expanded glass beads and combinations thereof.

8. A method of establishing plant growth in a soil surface comprising the steps of thoroughly mixing together a major amount by weight of a hardenable binder material and minor amounts by weight of plant seeds, plant-growth-promoting materials and filler materials to form a potentially hardenable composition, said binder material comprising gypsum stucco, substantially covering a soil surface with a layer of said potentially hardenable composition, applying a quantity of water to said layer, the ratio of solids to water permitting the hardening of said composition, said ratio of solids to water being from about 10:90 to about 60:40, whereby said gypsum stucco forms a substantially continuous, thin, set gypsum layer containing said plant seeds, said plant-growth-promoting materials and said filler materials, said set gypsum later being of a thickness which allows said plant seeds, said plant-growth-promoting materials and said filler materials to be accessible to moisture while substantially preventing their relative movement thereby leaving said plant seeds free to germinate and the soil surface is protected against erosion.

9. A composition which is particularly adaptable to be formed into a medium for plant seed germination comprising a major amount by weight of a gypsum stucco hardenable binder material and a minor amount by weight of plant seeds and cellulosic fibrous materials.

10. A composition which is particularly adaptable to be formed into a medium for plant seed germination comprising a major amount by weight of gypsum stucco binder material and minor amounts by weight of plant seeds, plant-growth-promoting materials and filler materials.

11. The composition as defined in claim 10 wherein the filler material is an organic material.

12. The composition as defined in claim 10 wherein the filler material is selected from the group consisting of discrete cellulosic fibers, shredded waste newsprint and combinations thereof.

13. The composition as defined in claim 10 wherein the filler material is an inorganic material.

14. The composition as defined in claim 10 wherein the filler material is selected from the group consisting of vermiculite, perlite, expanded glass beads and combinations thereof.

15. A composition which is particularly adaptable to be formed into a medium for plant seed germination comprising a major amount by weight of a gypsum stucco hardenable binder material and a minor amount by weight of plant seeds and a set retarder for said stucco.

16. An aqueous sprayable slurry consisting of from about 10 percent to 60 percent solids and about 90 percent to 40 percent water, said solids comprising a major amount by weight of gypsum stucco and a minor amount by weight of plant seeds.

17. A slurry as defined in claim 16 wherein said solids further comprise a minor amount by weight of cellulosic fibrous material.

18. A slurry as defined in claim 6 wherein said solids further comprise a minor amount by weight of set retarder for lengthening the setting time of said gypsum stucco.

19. A method of establishing plant growth in a soil surface comprising the steps of substantially covering the surface of an area of soil with a composition comprising a hardenable gypsum stucco binder material which has plant seeds distributed substantially uniformly throughout by distributing an aqueous slurry which contains said gypsum stucco and plant seeds, said aqueous slurry having a solids content of from about 10 percent to 60 percent hardening said binder material thereby forming a substantially continuous, thin layer containing said plant seeds, said layer being of a thickness which allows said plant seeds to be accessible to moisture while substantially preventing their relative movement whereby said plant seeds are free to germinate and the soil surface is protected against erosion.

20. A method of establishing plant growth in a soil surface comprising the steps of substantially covering the surface of an area of soil with a composition comprising a hardenable gypsum stucco binder material which has plant seeds distributed substantially uniformly throughout, hardening said binder material thereby forming a substantially continuous, thin layer containing about 5 percent by weight of said plant seeds, said layer being of a thickness of about 1/16 inch which allows said plant seeds to be accessible to moisture while substantially preventing their relative movement whereby said plant seeds are free to germinate and the soil surface is protected against erosion.

PO-1050
(5/69)

UNITED STATES PATENT OFFICE
CERTIFICATE OF CORRECTION

Patent No. 3,600,852    Dated August 24, 1971

Inventor(s) William R. Burke and Donald R. Kole

It is certified that error appears in the above-identified patent and that said Letters Patent are hereby corrected as shown below:

Column 1, line 43, period missing after "soil";

same column, line 59, comma missing after "water";

same column, line 72, "minor weight" should be ---plant---;

same column, line 74, "of" should be ---or---.

Column 2, line 34, "$G_aSO_4 \cdot 1/2H_2O$" should be ---$C_aSO_4 \cdot 1/2H_2O$---.

Column 3, line 57, "includes" should be ---include---;

same column, line 71, "may" omitted before "be".

Claim 2, 3rd line should read "amount by weight of" not "amount of weight by";

same claim, line 9, comma missing after "composition";

same claim, line 10, "whereby" omitted after ",".

Claim 8, line 14, "later" should be ---layer---.

Claim 18, line 1, "6" should be ---16---.

Signed and sealed this 29th day of February 1972.

(SEAL)
Attest:

EDWARD M. FLETCHER, JR.        ROBERT GOTTSCHALK
Attesting Officer              Commissioner of Patents